(12) United States Patent
Sanada et al.

(10) Patent No.: US 10,549,563 B1
(45) Date of Patent: Feb. 4, 2020

(54) MAGNETIC INK READING APPARATUS AND PRINTER

(71) Applicant: TOSHIBA TEC KABUSHIKI KAISHA, Shinagawa-ku, Tokyo (JP)

(72) Inventors: Tsuyoshi Sanada, Susono Shizuoka (JP); Yuji Kawamorita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/154,801

(22) Filed: Oct. 9, 2018

(51) Int. Cl.
*B41L 45/12* (2006.01)
*G06K 9/18* (2006.01)
*B41J 13/00* (2006.01)
*B41J 29/393* (2006.01)

(52) U.S. Cl.
CPC ........... *B41L 45/12* (2013.01); *B41J 13/0009* (2013.01); *B41J 29/393* (2013.01); *G06K 9/186* (2013.01)

(58) Field of Classification Search
CPC ...... B41J 45/12; B41J 13/0009; B41J 29/393; G06K 9/186
See application file for complete search history.

(56) References Cited

U.S. PATENT DOCUMENTS

| | | | | |
|---|---|---|---|---|
| 6,243,504 | B1* | 6/2001 | Kruppa | G06K 7/0004 382/318 |
| 2006/0043182 | A1* | 3/2006 | Kinoshita | G06K 9/186 235/449 |
| 2017/0200055 | A1* | 7/2017 | Saga | G06K 9/0053 |

FOREIGN PATENT DOCUMENTS

JP  2012-198789  10/2012

\* cited by examiner

*Primary Examiner* — Lamson D Nguyen
(74) *Attorney, Agent, or Firm* — Amin, Turocy & Watson, LLP

(57) ABSTRACT

According to one embodiment, a magnetic ink reading apparatus includes a transport mechanism, a magnetizing mechanism, a magnetic detection head, a pressing pad, and a friction pad. The transport mechanism transports, along a transport path, a sheet type medium subjected to printing by using magnetic ink. The magnetizing mechanism magnetizes the magnetic ink of the medium on the transport path. The magnetic detection head is arranged along the transport path and reads magnetism of the magnetized magnetic ink. The pressing pad is arranged at a certain distance from one side end portion of the transport path in a width direction, facing the magnetic detection head with the transport path interposed therebetween, and presses the medium transported along the transport path against the magnetic detection head. The friction pad is arranged at a certain distance from the side end portion of the transport path, facing the transport path, and is spaced apart from the pressing pad in a width direction of the medium.

20 Claims, 3 Drawing Sheets

MAGNETIC INK READING APPARATUS AND PRINTER

FIELD

Embodiments described herein relate generally to a magnetic ink reading apparatus, a printer, and a magnetic ink reading method, which read a character or an image printed on a piece of paper or the like by using a magnetic ink.

BACKGROUND

Characters, for example, magnetic ink character recognition (MICR) characters, may be printed on a surface of a medium, such as a promissory note, check, or the like, by using magnetic ink (see FIG. 2). Such MICR characters may be read as follows, by a magnetic ink reading apparatus. In other words, when a user inserts the medium into the magnetic ink reading apparatus, a magnet magnetizes the MICR characters. Then, a magnetic detection head (MICR head) detects a residual magnetic field generated by residual magnetism of the MICR characters such that the magnetic ink reading apparatus identifies the MICR characters based on magnetic characteristics or magnetic patterns of the residual magnetic field. The magnetic ink reading apparatus may distinguish the promissory note or the check via the MICR characters.

Such a magnetic ink reading apparatus is used, for example, by being included in a printer of an ATM or a POS.

In the printer, a magnet, a magnetic detection head, a feed roller and a pinch roller, an inkjet head, and a platen are arranged along a transport path. Also, a motor driving the feed roller is provided.

A strong permanent magnet is used as the magnet to stably magnetize the MICR characters. Also, the magnet and the magnetic detection head are provided according to a position of the MICR characters on a medium P to be transported on a transport path K, that is, according to a position about 0.3 inches away from a side end portion of the medium P.

The printer configured as such magnetizes the MICR characters, and reads or prints by detecting the residual magnetic field. In such a printer, since the MICR characters need to be accurately read, it is necessary to stably contact the magnetic detection head to the MICR characters.

In order for the magnetic detection head to stably contact the MICR characters, a pressing pad is arranged to face the magnetic detection head such that the MICR characters and the magnetic detection head contact each other by a pressing force thereof. In particular, the pressing force needs to increase such that a medium with residual folding wrinkles surely press the magnetic detection head.

However, when the pressing force of the pressing pad is excessively increased, the medium is skewed due to an imbalance in a width direction of the medium, that is, in a direction perpendicular to a transport direction. When the medium is skewed, reading accuracy of the magnetic detection head may decrease.

DESCRIPTION OF THE DRAWINGS

FIG. 1 is a diagram for illustrating a schematic configuration of a printer including a magnetic ink reading apparatus according to an embodiment, while a pressing pad is standing by;

DETAILED DESCRIPTION

There is a demand for an apparatus capable of a stable reading without a medium being skewed even when a pressing force of the magnetic detection head towards the medium is increased. Hereinafter, an exemplary embodiment will be described with reference to the drawings.

Figure 1:
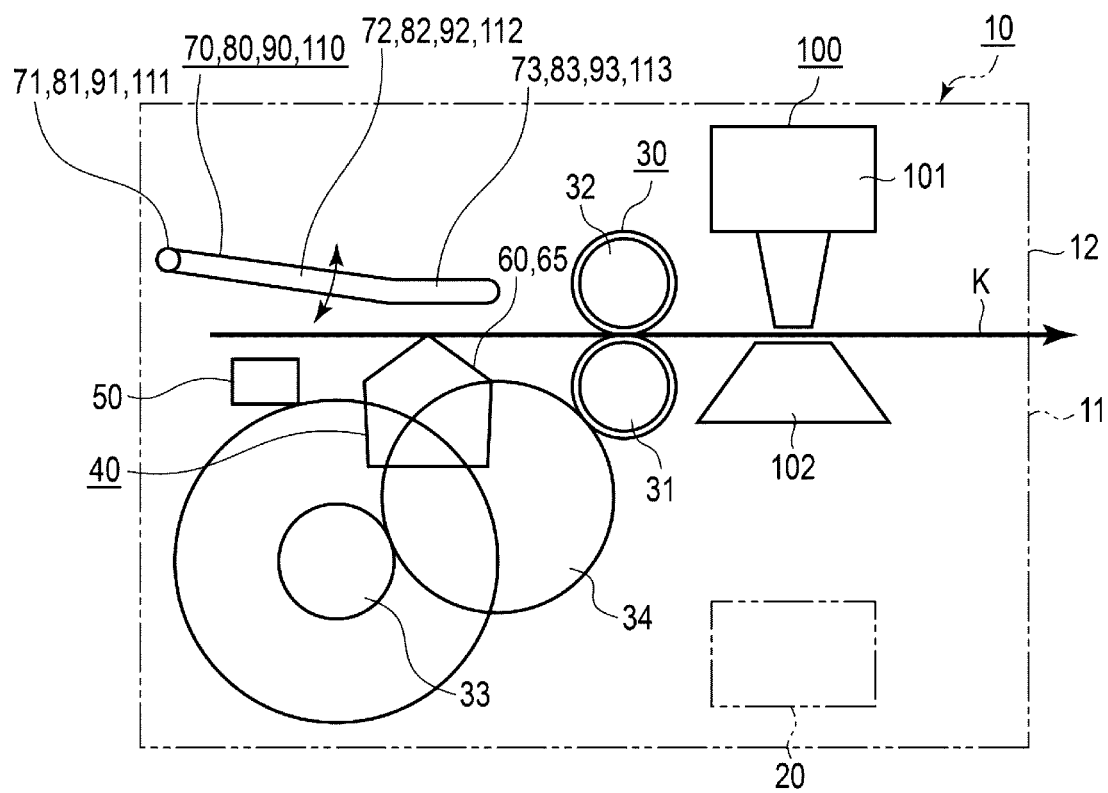
Figure 2:
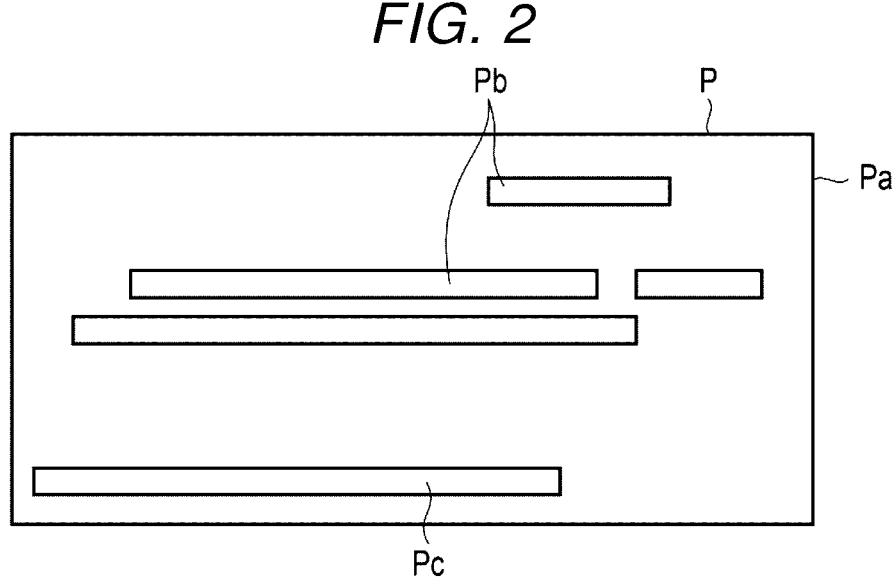
FIG. 2 is a plan view of an example of a medium applied to the magnetic ink reading apparatus.
Figure 3:
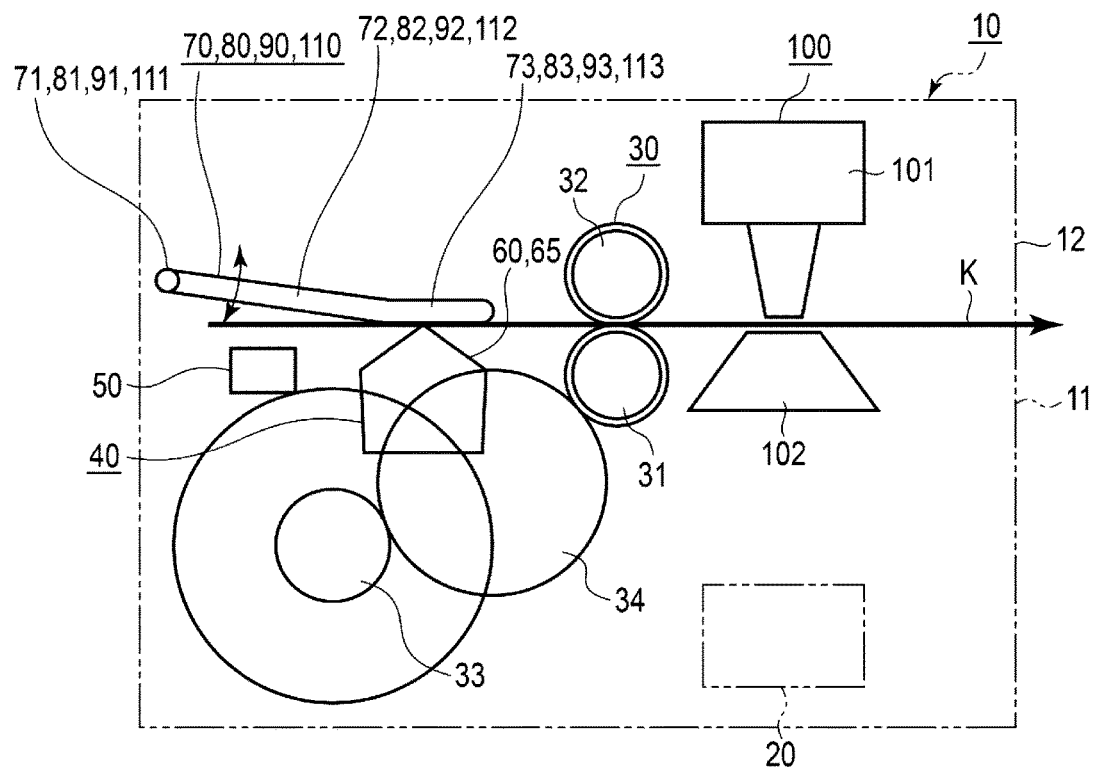
FIG. 3 is a diagram for illustrating a schematic configuration of the printer including the magnetic ink reading apparatus, while the pressing pad is operating.
Figure 4:
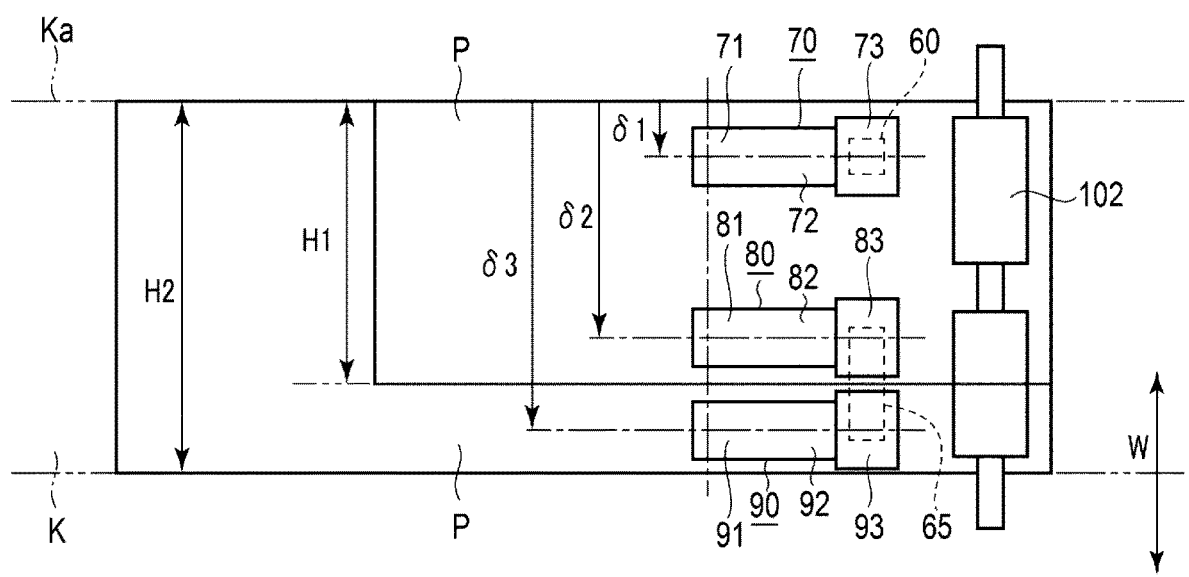
FIG. 4 is a plan view of the magnetic ink reading apparatus.

FIG. 1 is a diagram for illustrating a schematic configuration of a printer 10 including a magnetic ink reading apparatus 40 according to the embodiment, while a pressing pad is standing by, FIG. 2 is a plan view of an example of a medium P applied to the magnetic ink reading apparatus 40, FIG. 3 is a diagram for illustrating a schematic configuration of the printer 10 including the magnetic ink reading apparatus 40, while the pressing pad is operating, and FIG. 4 is a plan view of the magnetic ink reading apparatus 40. In FIGS. 1, 3, and 4, K denotes a transport path of the medium P. In FIGS. 1 and 3, since a pressing pad mechanism 70, a first friction pad mechanism 80, and a second friction pad mechanism 90 are located at the same position when viewed from the side, they are shown together. In addition, the printer 10 may use a promissory note or a check as the medium P, wherein a paper width thereof is a first paper width H1 and a second paper width H2 wider than the first paper width H1. The first paper width H1 is, for example, 2.75 inches. The second paper width H2 is, for example, 3.5 inches.

The printer 10 may be included in, for example, an ATM of a bank or the like, or a point of sales (POS) terminal of a store, warehouse, or the like. As shown in FIG. 2, the medium P has a sheet-type medium body Pa. On the medium body Pa, characters Pb are printed by using general ink and MICR characters Pc are printed by using magnetic ink. The MICR characters Pc are printed at a region about 0.3 inches away from one side end portion of a width direction W of a transport direction.

The printer 10 includes a housing 11. The transport path K in which a dimension in the width direction W is slightly larger than, for example, the second paper width H2 is formed inside the housing 11. An entrance 12 which the medium P is inserted or discharged from the outside is provided at the right end of the transport path K in FIG. 1. Further, a user inserts the medium P into the printer 10 while a surface of the medium P where magnetic ink is pre-printed faces downward in FIG. 1.

Inside the housing 11, accommodated are a control unit 20, a transport mechanism 30, the magnetic ink reading apparatus 40, the pressing pad mechanism 70, the first friction pad mechanism 80, the second friction pad mechanism 90, and a printing mechanism 100. The printing mechanism 100 is provided closer to the entrance 12 than the magnetic ink reading apparatus 40. The control unit 20 cooperatively controls in linkage the transport mechanism 30, the magnetic ink reading apparatus 40, the pressing pad mechanism 70, the first friction pad mechanism 80, the second friction pad mechanism 90, and the printing mechanism 100.

The transport mechanism 30 forms the transport path K through which the sheet type medium P subjected to printing by using magnetic ink is transported by using a plurality of rollers and the like, including a feed roller 31 and a pinch roller 32. The transport mechanism 30 includes a motor 33 and a gear mechanism 34 for transferring rotational force of the motor 33 to each roller.

The magnetic ink reading apparatus 40 includes a magnetizing mechanism 50, an MICR head (magnetic detection head) 60, and the pressing pad mechanism 70. The magnetizing mechanism 50 magnetizes the magnetic ink of the medium P transported on the transport path K. The MICR head 60 is arranged near the downstream of the transport path K of the magnetizing mechanism 50 in a transport direction, thereby reading magnetism of the magnetized magnetic ink. A distance between the MICR head 60 and the magnetizing mechanism 50 is, for example, about 1.5 to 2 inches. The pressing pad mechanism 70 presses the medium P on the transport path K to the MICR head 60 side.

The magnetizing mechanism 50 includes a magnet 51 that is arranged such that the surface of the medium P faces an N-polar surface or an S-polar surface. The MICR head 60 is arranged at a position about 0.3 inches away from one side end portion of the transport path K in the width direction W, corresponding to the position of the MICR characters Pc. As shown in FIG. 4, a dummy head 65 is arranged with respect to the MICR head 60.

The MICR head 60 detects residual magnetic force of the MICR characters Pc. The MICR characters Pc are read as magnetic characteristics or magnetic patterns, wherein the magnetic characteristics or magnetic patterns are output to the control unit 20 as an electric signal. The magnetic characteristics or the magnetic patterns of the MICR characters Pc are pre-registered in the control unit 20, and the control unit 20 identifies the MICR characters Pc by matching the pre-registered magnetic characteristics or magnetic patterns with the read magnetic characteristics or magnetic patterns in the control unit 20.

A top surface shape of the dummy head 65 is almost identical to a top surface shape of the MICR head 60, and friction coefficients thereof are also almost the same, but the dummy head 65 does not have a magnetic detection function. The dummy head 65 has a function of assigning a friction force equivalent to that of the MICR head 60 to the medium P passing on the transport path K to prevent imbalance of a transporting force, thereby preventing skewing to prevent the medium P from meandering.

The pressing pad mechanism 70 includes a support mechanism 71 arranged above the magnetizing mechanism 50 in FIG. 1, an arm 72 mounted pivotably on the support mechanism 71, and the pressing pad 73 attached to a tip of the arm 72 and formed of resin material. A dimension of the pressing pad 73 in the width direction W is about 1 inch, which is approximately the same as a dimension of the MICR head 60 in the width direction W. The support mechanism 71 moves the arm 72 in a vertical direction at certain timing, by using a cam mechanism (not shown).

The pressing pad 73 is arranged to face the MICR head 60 with the transport path K interposed therebetween. A center position of the pressing pad 73 in the width direction W is a certain distance 81 away from one side end portion Ka of the transport path K in the width direction W. The certain distance 81 is, for example, about 0.3 inches. When the arm 72 is moving downward, the pressing pad 73 presses the medium P transported along the transport path K towards the MICR head 60, by using a spring (not shown) or the like.

The first friction pad mechanism 80 includes a support mechanism 81 arranged above the magnetizing mechanism 50 in FIG. 1, an arm 82 mounted pivotably on the support mechanism 81, and a first friction pad 83 attached to a tip of the arm 82 and formed of resin material. A dimension of the first friction pad 83 in the width direction W is a dimension capable of assigning sufficient friction force to the medium P, for example, about 0.8 inches.

A center position of the first friction pad 83 in the width direction W is spaced apart from the pressing pad 73 in the width direction W of the medium P, and faces the dummy head 65 with the transport path K interposed therebetween. The center position of the first friction pad 83 in the width direction W is a certain distance $\delta 2$ away from the one side end portion Ka of the transport path K. The certain distance $\delta 2$ is, for example, about 2.2 inches. When the arm 82 is moving downward, the first friction pad 83 presses the medium P transported along the transport path K towards the dummy head 65, by using a spring (not shown) or the like.

The second friction pad mechanism 90 includes a support mechanism 91 arranged above the magnetizing mechanism 50 in FIG. 1, an arm 92 mounted pivotably on the support mechanism 91, and a second friction pad 93 attached to a tip of the arm 92 and formed of resin material. A dimension of the second friction pad 93 in the width direction W is, for example, about 1 inch, which is larger than the dimension of the MICR head 60 in the width direction W.

A center position of the second friction pad 93 in the width direction W is spaced apart from the pressing pad 73 and the first friction pad 83 in the width direction W of the medium P, and faces the dummy head 65 with the transport path K interposed therebetween. The center position of the second friction pad 93 in the width direction W is a certain distance $\delta 3$ away from the one side end portion Ka of the transport path K. The certain distance $\delta 3$ is, for example, about 3.2 inches. When the arm 92 is moving downward, the second friction pad 93 presses the medium P transported along the transport path K towards the dummy head 65, by using a spring (not shown) or the like.

Here, with respect to each pressing force of the pressing pad mechanism 70, the first friction pad mechanism 80, and the second friction pad mechanism 90, the springs (not shown) need to be adjusted such that the pressing forces of the first friction pad mechanism 80 and the pressing pad mechanism 70 are the same, and the second friction pad mechanism 90 has a slightly weaker pressing force, thereby minimizing imbalance in the width direction W.

The printing mechanism 100 includes an inkjet head 101 and a platen 102 facing the inkjet head 101 with the transport path K interposed therebetween.

The printer 10 configured as such reads and prints magnetic ink as follows. The user inserts the medium P into the entrance 12 of the housing 11 wherein the surface on which the MICR characters Pc are printed faces downward. The inserted medium P is transported in a left direction of FIG. 1 along the transport path K, by the transport mechanism 30.

When the medium P passes through the magnetizing mechanism 50, the MICR characters Pc also pass through the magnetizing mechanism 50. Here, the MICR characters Pc are magnetized by magnetic force of the magnet 51.

Then, the medium P is transported in a right direction of FIG. 1 by the transport mechanism 30, and the MICR characters Pc pass through the MICR head 60. The arm 72 of the pressing pad mechanism 70 moves downward according to an operation of the cam mechanism as shown in FIG. 3, in synchronization with transportation of the transport mechanism 30, and the pressing pad 73 presses the medium P to the MICR head 60 side. At the same time, the arm 82 of the first friction pad mechanism 80 and the arm 92 of the second friction pad mechanism 90 move downward according to the operation of the cam mechanism, and the first friction pad 83 and the second friction pad 93 press the medium P to the dummy head 65 side. At this time, a residual magnetic field generated by residual magnetism of the MICR characters Pc is detected by the MICR head 60. The MICR characters Pc are identified based on magnetic characteristics or magnetic patterns of the residual magnetism. Information specified in the medium P is determined by the identified MICR characters Pc.

Then, when the medium P is transported in the right direction of FIG. 1 by the transport mechanism 30 and reaches the printing mechanism 100, the inkjet head 101 prints "used", "invalid", or the like based on the detection result of the medium P.

The medium P subjected to printing is discharged by the transport mechanism 30 through the entrance 12 of the housing 11.

According to the printer 10 configured as such, since the medium P is pressed against the MICR head 60 by the pressing pad 73, the residual magnetism of the MICR characters Pc is accurately read by the MICR head 60. Accordingly, occurrence of misrecognition or error can be minimized even when the medium P is slightly wrinkled.

Also, even when the pressing pad 73 applies a strong pressing force to the medium P, unbalanced force does not occur in the width direction W of the medium P since the first friction pad 83 or the second friction pad 93 provided in parallel with the pressing pad 73 also presses the medium P with a suitable pressing force. Accordingly, the medium P is not skewed and is read with high accuracy.

An overall transporting load of the transport mechanism 30 increases since the pressing force of the first friction pad 83 or the second friction pad 93 is applied in addition to the pressing force of the pressing pad 73. Accordingly, irregular rotation of the motor 33 is controlled and fluctuation of a transporting speed of the medium P is reduced, and reading can be performed with high accuracy.

Figure 5:
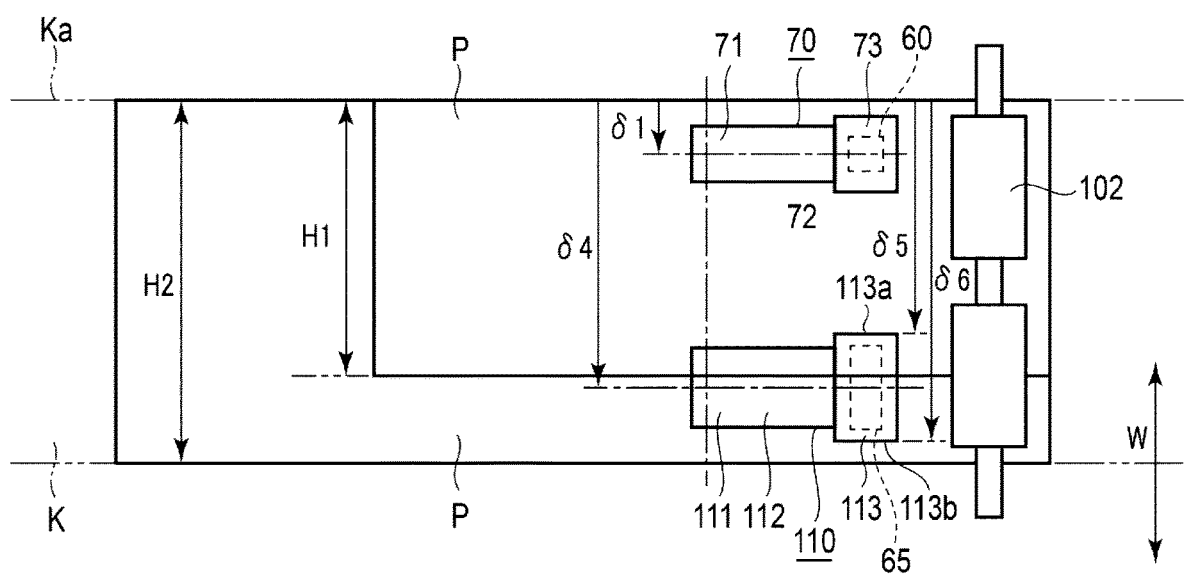
FIG. 5 is a plan view of a modified example of the magnetic ink reading apparatus.

FIG. 5 is a plan view of a modified example of the magnetic ink reading apparatus 40. In FIG. 5, components having the same functions as those of FIGS. 1, 3, and 4 are denoted by the same reference numerals, and detailed information thereof are omitted. In FIG. 5, K denotes a transport path of the medium P. Since the pressing pad mechanism 70 and a wide friction pad mechanism 110 are located at the same position when viewed from the side, they are shown together in FIGS. 1 and 3.

In the modified example, the wide friction pad mechanism 110 is provided instead of the first friction pad mechanism 80 or the second friction pad mechanism 90. The wide friction pad mechanism 110 includes a support mechanism 111 arranged above the magnetizing mechanism 50 of FIG. 1, an arm 112 mounted pivotably on the support mechanism 111, and a wide friction pad (third pad) 113 attached to a tip of the arm 112 and formed of resin material. A dimension of the wide friction pad 113 in the width direction W is about 1.2 inches, which is a width capable of applying a sufficient pressing force to the first paper width H1 and the second paper width H2.

The wide friction pad 113 faces the dummy head 65 with the transport path K interposed therebetween. A center position of the wide friction pad 113 in the width direction W is spaced apart from the pressing pad 73 in the width direction W of the medium P. The center position of the wide friction pad 113 in the width direction W is at a certain distance δ4 from the side end portion Ka of the transport path K. The certain distance δ4 is, for example, about 2.9 inches. The certain distance δ4 is an intermediate distance between a position δ5 and a position δ6 described below. When the arm 112 is moving downward, the wide friction pad 113 presses the medium P transported along the transport path K to the dummy head 65 side, by using a spring (not shown) or the like.

The wide friction pad 113 has one side end 113a at the position δ5 (about 2.3 inches) having a dimension smaller than the first paper width H1 and the other side end 113b at the position δ6 (about 3.5 inches) having a dimension smaller than the second paper width H2, based on the side end portion Ka of the transport path K. In other words, the position δ5 and the position δ6 are set such that the one wide friction pad 113 correspond to the medium P having the first paper width H1 as well as the medium P having the second paper width H2.

When the arm 112 is moving downward, the wide friction pad 113 presses the medium P transported along the transport path K to the dummy head 65 side.

The printer 10 using the wide friction pad mechanism 110 configured as such can also have the same effects as when the pressing pad mechanism 70 described above is used.

In the above embodiments, although it is described that the medium P is a promissory note or a check and has a paper width of 2.75 inches or 3.5 inches, a paper having another dimension may be used. Also, a dimension of each pressing pad or friction pad is not limited to that described above. Also, in the embodiment of FIG. 4, the first friction pad mechanism 80 or the second friction pad mechanism 90 are used, but in some cases, it is not necessary to provide two friction pad mechanisms. In other words, regardless of the paper width of the medium P, the second friction pad mechanism 90 may be omitted. Also, when the paper width of the medium P is limited to the second paper width H2, the first friction pad mechanism 80 may be omitted.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A magnetic ink reading apparatus comprising:
   a transport mechanism for transporting, along a transport path, a sheet type medium having printed thereon a magnetic ink and having a certain paper width;
   a magnetizing mechanism for magnetizing the magnetic ink on the sheet type medium on the transport path;
   a magnetic detection head arranged along the transport path for reading magnetism of the magnetized magnetic ink;
   a pressing pad arranged at a first distance from one side end portion of the transport path in a width direction, facing the magnetic detection head with the transport path interposed therebetween, for pressing the sheet type medium transported along the transport path against the magnetic detection head; and
   a friction pad arranged at a second distance from the side end portion of the transport path, facing the transport path, and spaced apart from the pressing pad in a width direction of the sheet type medium.

2. The apparatus according to claim 1, wherein
the sheet type medium has a first paper width smaller than a dimension in the width direction of the transport path or has a second paper width larger than the first paper width and smaller than the dimension in the width direction of the transport path, and
the friction pad is provided at a position having a dimension smaller than the first paper width based on the side end portion.

3. The apparatus according to claim 1, wherein
the sheet type medium has a first paper width smaller than a dimension in the width direction of the transport path or has a second paper width larger than the first paper width, and
the friction pad includes a first pad arranged at a position having a dimension smaller than the first paper width based on the side end portion and a second pad arranged at a position having a dimension larger than the first paper width and smaller than the second paper width.

4. The apparatus according to claim 1, wherein
the sheet type medium has a first paper width smaller than a dimension in the width direction of the transport path or has a second paper width larger than the first paper width, and
the friction pad includes a third pad having one side end at a position having a dimension smaller than the first paper width based on the side end portion and the other side end at a position having a dimension larger than the first paper width and smaller than the second paper width.

5. The apparatus according to claim 1, wherein
the sheet type medium is a check.

6. A bank automatic teller machine comprising the apparatus according to claim 1.

7. A printer comprising:
a transport mechanism for transporting, along a transport path, a sheet type medium having printed thereon a magnetic ink and having a certain paper width;
a magnetizing mechanism for magnetizing the magnetic ink on the sheet type medium on the transport path;
a magnetic detection head arranged adjacent to the magnetizing mechanism along the transport path for reading magnetism of the magnetized magnetic ink;
a printing mechanism arranged on the transport path for printing on the sheet type medium;
a pressing pad arranged at a certain distance from one side end portion of the transport path in a width direction, facing the magnetic detection head with the transport path interposed therebetween, for pressing the sheet type medium transported along the transport path against the magnetic detection head; and
a friction pad arranged at a certain distance from the side end portion of the transport path, facing the transport path, and spaced apart from the pressing pad in a width direction of the sheet type medium.

8. The printer according to claim 7, wherein
the sheet type medium has a first paper width smaller than a dimension in the width direction of the transport path or has a second paper width larger than the first paper width and smaller than the dimension in the width direction of the transport path, and
the friction pad is provided at a position having a dimension smaller than the first paper width based on the side end portion.

9. The printer according to claim 7, wherein
the sheet type medium has a first paper width smaller than a dimension in the width direction of the transport path or has a second paper width larger than the first paper width, and
the friction pad includes a first pad arranged at a position having a dimension smaller than the first paper width based on the side end portion and a second pad arranged at a position having a dimension larger than the first paper width and smaller than the second paper width.

10. The printer according to claim 7, wherein
the sheet type medium has a first paper width smaller than a dimension in the width direction of the transport path or has a second paper width larger than the first paper width, and
the friction pad includes a third pad having one side end at a position having a dimension smaller than the first paper width based on the side end portion and the other side end at a position having a dimension larger than the first paper width and smaller than the second paper width.

11. The printer according to claim 7, wherein
the printing mechanism comprises an inkjet head.

12. The printer according to claim 7, wherein
the printing mechanism comprises magnetic ink.

13. The printer according to claim 7, wherein
the sheet type medium is a check.

14. The printer according to claim 7, wherein
the sheet type medium is a wrinkled check.

15. A point of sale machine comprising the printer according to claim 7.

16. A magnetic ink reading method comprising:
transporting, along a transport path, a sheet type medium having printed thereon a magnetic ink and having a certain paper width;
magnetizing the magnetic ink on the sheet type medium on the transport path;
reading magnetism of the magnetized magnetic ink along the transport path;
pressing the sheet type medium transported along the transport path against a magnetic detection head using a pressing pad arranged at a first distance from one side end portion of the transport path in a width direction and facing the magnetic detection head with the transport path interposed therebetween; and
passing the sheet type medium by a friction pad arranged at a second distance from the side end portion of the transport path, facing the transport path, and spaced apart from the pressing pad in a width direction of the sheet type medium.

17. The magnetic ink reading method according to claim 16, wherein
the sheet type medium is a check.

18. The magnetic ink reading method according to claim 16, wherein
the sheet type medium is a wrinkled check.

19. The magnetic ink reading method according to claim 16 further comprising:
printing on the sheet type medium.

20. The magnetic ink reading method according to claim 16 further comprising:
printing another magnetic ink on the sheet type medium.

* * * * *